May 29, 1934.    R. C. COBEL    1,960,729
METHOD OF MAKING ARTICLES OF GLASSWARE
Filed April 7, 1930    3 Sheets-Sheet 1
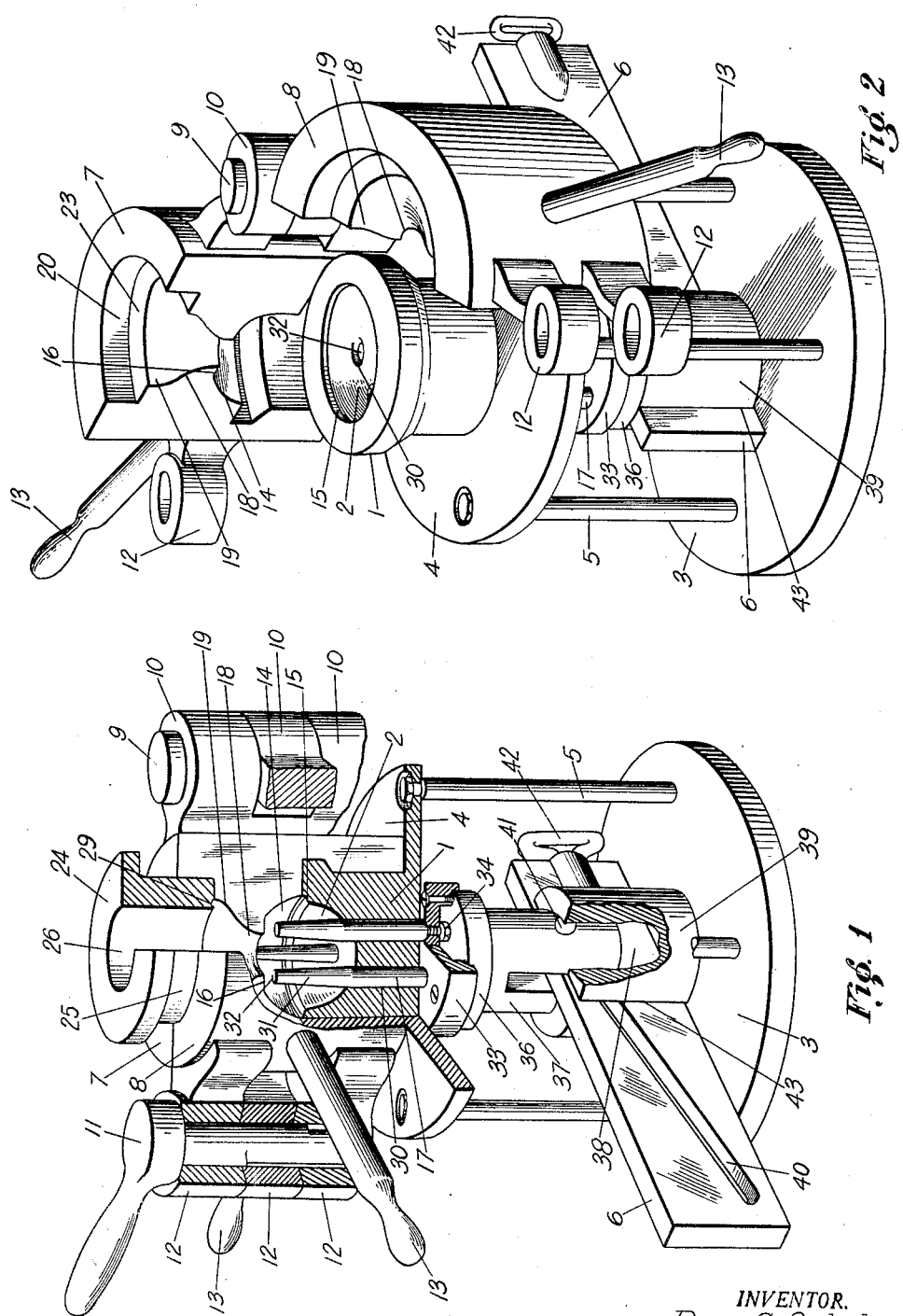
INVENTOR.
Ray C. Cobel.
BY
ATTORNEY May 29, 1934.  R. C. COBEL  1,960,729
METHOD OF MAKING ARTICLES OF GLASSWARE
Filed April 7, 1930  3 Sheets-Sheet 2
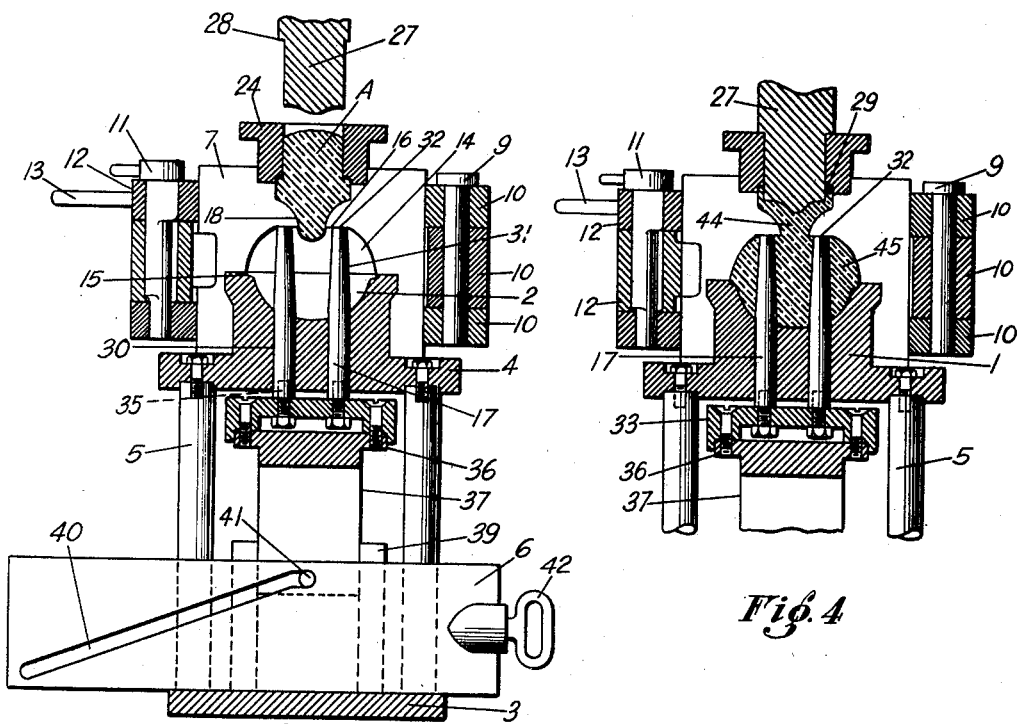
Fig. 4
Fig. 6
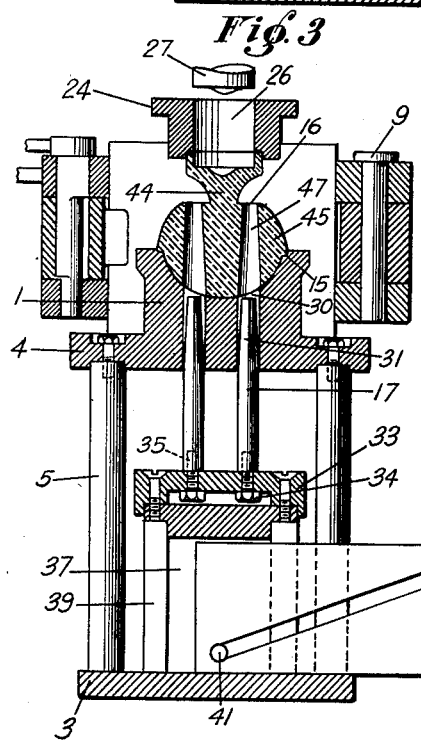
Fig. 3
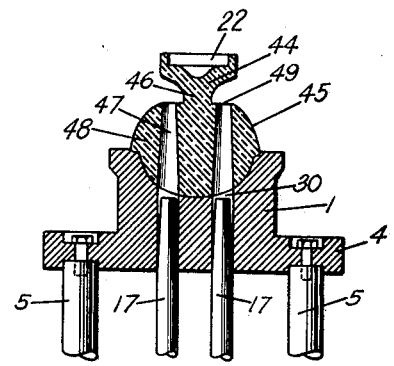
Fig. 5
INVENTOR.
Ray C. Cobel.
BY
ATTORNEY May 29, 1934.  R. C. COBEL  1,960,729
METHOD OF MAKING ARTICLES OF GLASSWARE
Filed April 7, 1930   3 Sheets-Sheet 3

INVENTOR.
Ray C. Cobel.
BY
Edwin P. Cobex
ATTORNEY

Patented May 29, 1934

1,960,729

UNITED STATES PATENT OFFICE 1,960,729

METHOD OF MAKING ARTICLES OF GLASSWARE

Ray C. Cobel, Newark, Ohio, assignor to A. H. Heisey & Company, Newark, Ohio

Application April 7, 1930, Serial No. 442,061

9 Claims. (Cl. 49—35)

My invention relates to method of making articles of glassware and, more particularly, it has to do with a method of making articles of glassware, such as flower blocks or the like, that are provided with a plurality of openings in the body portion thereof for holding and supporting the stems of flowers.

One object of my invention is to provide a method of making glassware, such as flower blocks and the like having an apertured body portion, in such a way as to reduce the cost of making such blocks without sacrificing the quality of the blocks.

Another object of my invention is to provide a method of making flower blocks or the like, whereby the openings therein will be entirely free from closed ends subsequent to the pressing operation, thus obviating the necessity for having a workman punch out the closed ends by hand.

Another object of my invention lies in the provision of a method for the manufacture of flower blocks, whereby the base of the finished article will be free from chips, cracks and other irregularities and, furthermore, will be smoothed and concave to present a surface of pleasing aspect to the eye.

Still another object of my invention is to provide a flower block that will rest firmly on a support surface without danger of scratching or marring the finish thereof, and furthermore, will not spin or rotate when placed thereon.

My invention contemplates the provision of a method of manufacturing flower blocks and the like, wherein a charge of glass is pressed while in a plastic state in a mold having a plurality of pins disposed therein. These pins are movable into and out of the mold cavity independently of the plunger and, prior to the pressing operation, are adapted to be moved upwardly into the mold until their flattened heads are in firm contact with the flattened upper surface of the mold cavity. Thus, when the charge of glass is pressed in the mold it will be shaped by the contour of the mold cavity and will completely surround each of the pins, although the material will be precluded from entering between the flattened heads of the pin and the flattened upper surface of the mold cavity in view of the fact that these two surfaces lie in intimate contact during the formation of the article in the mold.

After the molten material has become substantially fixed to allow the general contours of the openings in the article to retain their respective shapes, the pins are withdrawn therefrom by a suitable means forming a part of my invention, and the mold, which is preferably of the split section type is separated to allow ready access to the article. Furthermore, this mold is of the font type wherein the article that is formed therein will be equipped with a font by means of which the article may be readily lifted from the mold, any suitable means being employed to do this.

At this time, the pressed article comprises a body portion having a plurality of open-ended apertures therethrough, and a substantially flattened base portion provided with a font formed integrally therewith. While the article is still in a semi-plastic state, it is rotated in contact with the proper tools for reducing the neck of the font, until the neck has been reduced sufficiently to permit ready severance of the font from the main body portion.

The pressed article, thus far, retains the contour of the mold cavity of the split section mold. The next and final forming operation has to do with concaving and smoothing the base and removing the ragged fragments of material that might be left on the base subsequent to severance of the font. In order to accomplish this, I invert the blank in a former and the base thereof is reheated until the material becomes sufficiently plastic to allow a plunger to be forced downwardly thereon to concave and smooth this portion of the blank. This operation also tends to remove the mold marks from the base and the crown of the blank.

It is an advantageous feature of this invention that I form the blank and the openings therein by forcing a charge of glass into a mold cavity having a plurality of pins already disposed therein. It is apparent that a plurality of openings extending entirely through the blank and open at each end will be formed in this one single operation. Furthermore, the openings will be clean throughout their length and will not have ragged edges adjacent their respective ends.

Another advantageous feature of this invention resides in the fact that the blank may be pressed, reheated and finally shaped in a series of continuous operations that, as a result, will present a flower block incorporating several refinements over existing designs, such as a base that is free from chips and cracks and so forth.

Other objects and advantageous features of my invention will be noted in the following detailed description and one embodiment of my invention is shown in the accompanying sketches, wherein similar characters of reference designate corresponding parts and wherein:

Figure 1 is a perspective view, partly in section and partly broken away, showing an apparatus which I preferably use in performing my method mounted in assembled relation.

Figure 2 is a perspective view of the apparatus showing the split mold separated.

Figure 3 is a vertical sectional view of the mold showing a charge of glass disposed in the ring and upper section of the mold just prior to entering into the mold cavity.

Figure 4 is a vertical section of the mold cavity showing the charge of glass referred to in Figure 1 just after it has been forced downwardly thereinto by the plunger.

Figure 5 is a vertical sectional view of the mold structure showing the pins removed from the mold cavity and the glass blank, and also illustrating the means for removing these pins therefrom.

Figure 6 is a detail in section showing the glass blank supported in the lower half of the mold cavity with the pins removed therefrom.

Figure 7:
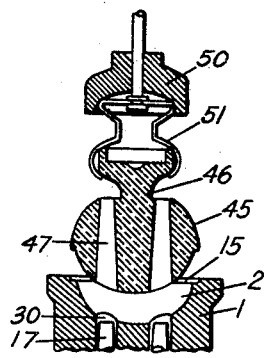
Figure 7 is a view illustrating the means which I employ for removing the blank from the mold, the article being shown in section.

Before entering into a detailed description of my method for manufacturing flower blocks, I would like to point out that I preferably utilize a font mold of the split section type, wherein the two halves of the mold are locked in cooperative relation around the mold block during the formation of the article, and are swung apart subsequent to withdrawal of the plunger therefrom to allow ready access to the article which remains supported, in this instance, in inverted position in the mold block.

The mold, as a whole, is preferably elevated above the base of the device in order that the preferred form of my push pin structure and the means for actuating it may be disposed below the block, since, in the operation of my device, the pins are adapted to be moved upwardly through the base of the mold block and into the interior of the cavity therein.

With reference to the drawings, I have shown in Figures 1, 2, 3 and 5 the apparatus which I preferably use for forming flower blocks, as comprising a circular mold block 1, equipped with a centrally disposed cup-shaped cavity 2 formed in the upper surface thereof. This mold block is superimposed on a circular base 3 by means of an integrally formed circular foot flange 4 that is supported on vertical rods 5 projecting upwardly from the base member. It will be noted that the preferred form of my push pin structure and the operating mechanism therefor is shown as lying intermediate the flange 4 and the base 3, the draw bar element 6 of the actuating means resting on and being supported by the base 3. This push pin structure and its correlated mechanism will be more fully hereinafter described.

As shown best in Figures 1 and 2, the mold block 1 is adapted to be enclosed by the semi-circular split sections 7 and 8 that are mounted adjacent thereto and are hinged together, at one side, by the cooperation of a pin 9 with the complemental aligning openings in the interfitting hinges 10 that are formed integrally with each section. When swung into closed relation, the split members are adapted to be held in locked relation by the removable mold key 11 that is disposed in the vertically aligned openings formed in the cooperating mold lugs 12. These lugs are similar in structure to the hinges 10 and are formed on the diametrically opposite side of the split sections. In addition, each split section 7 and 8 is provided with a handle member 13 by means of which the split sections may be readily swung apart on removal of the key 11.

It is apparent that when the split members 7 and 8 are locked in closed relation, as in Figure 1, they will enclose the mold block 1. Each respective section is so formed interiorly that when they are locked together an opening that leads downwardly into the mold cavity will be formed. This mold cavity as a whole is preferably made up of a circular cup-shaped lower cavity 2 that is formed in the mold block, and an inverted cup-shaped upper cavity 14 that is formed by the cooperation of the split members 7 and 8 and is adapted to cooperate with and overlie the cavity 2 when the split sections are locked in closed relation.

I, preferably, initially form my flower blocks in inverted position, the crown of the article will be formed in the cavity 2 in the mold block and the base thereof will take its initial shape in the cavity 14 although the article is pressed as an integral whole. These two cavities are substantially cup-shaped, but they differ slightly in contour. The lower cavity 2 is circular in horizontal cross-section and substantially arcuate in vertical cross-section. An annular cut away portion 15 is formed in the mold block adjacent the upper extremity of the cavity 2, and as will be hereinafter apparent, this cut away portion will form a shoulder on the completed article. The upper cavity 14 is also circular in horizontal cross-section and substantially arcuate in vertical cross-section, the uppermost interior surface thereof being substantially flat or level, as at 16, against which the flattened heads of a plurality of pins 17 are adapted to lie. The diameter of the lowermost end of this section of the mold cavity is slightly greater than the upper end of the lower section 2 of the mold cavity. Furthermore, the flattened section 16 will form a substantially flat base on the article pressed in this mold, and as will be noted in the drawings, it is this portion of the article to which the font is attached. The font will be subsequently removed therefrom and the base concaved during the finishing of the blank, as will be explained hereinafter.

As hereinbefore mentioned, the split sections 7 and 8 cooperate to form an opening that leads downwardly into the mold cavity just described. This opening is somewhat reduced in diameter, as at 18, to form a narrow neck directly above the mold cavity. The walls of this neck flare outwardly and upwardly therefrom to form a funnel-like opening, as at 19, the wall of the opening above this funnel-like opening being substantially cylindrical as at 20. It is within this passageway that I preferably intend to form the font attached to the pressed article, the narrow neck 46, Figure 6, of the font being formed in the neck 18 of the opening, and the foot 22 being formed in the funnel-like opening 19 and the cylindrical portion 20 thereof.

A ledge 23 is formed in the upper surface of the split member and lies in concentric relation to the opening leading downwardly into the mold cavity. This ledge 23 is adapted to receive and support a ring 24, that is mounted thereon. This ring comprises an integrally formed neck 25 that is bored centrally as at 26 for the reception of a charge of glass A (Figure 3) and a plunger 27. It is apparent that the opening 26 in the ring 24 is aligned with the passage leading downwardly into the mold cavity in order that the charge of glass may be properly conducted thereto.

To limit the downward travel of the plunger, a shoulder 28 is formed thereon that is adapted to cooperate with the upper surface of the mold ring adjacent the opening 26 to restrict downward movement of the plunger. This shoulder also maintains the ring firmly seated upon the upper mold sections during the pressing operation. It will be noted in Figure 4 that the ring member 24 has an annular cut away portion 29 adjacent the lower end thereof to allow clearance between the exterior surface of the plunger and the wall of this cut away portion. When the glass is pressed into the mold cavity, the molten material will flow around the lowermost end of the plunger and into the space between the plunger and the wall of this cut away portion, to form an annular foot on the font. Subsequent upward movement of the material is free.

The charge of glass A may be disposed in the neck of the ring in any manner desired and the plunger 27 may be brought into cooperation therewith by means of a hand operated device or, if desired, may be actuated by suitable power driven machinery.

It will be noted, in Figures 1, 3, 4 and 5, that the mold block 1 is provided with a plurality of openings 30 that extend upwardly through the base thereof and open into the lower arcuate portion of the mold cavity 2. Each opening is preferably identical in every respect.

Referring to Figure 4, it will be noted that each of the openings 30 has a pin 17 disposed therein. These pins are adapted to be moved up and down into and out of the mold cavity by a means that will be hereinafter described. Each pin preferably comprises a body portion 17, that is substantially cylindrical throughout its length and is provided with a tapering portion 31 terminating in an end portion having a flattened head 32.

The lowermost end of each pin is threaded interiorly and, when the pins are mounted in upright position on the circular carrier 33 they are rigidly secured thereto by the cap screw 34 that is threaded through the carrier member and into the threaded portion 35 just described. The circular carrier member 33 may be bolted or otherwise secured to the upper end of a cylindrical member 36 (see Figure 1) that is provided with a bifurcated end 37 and is adapted to reciprocate in a sleeve 38 extending upwardly from the base 3. This reciprocation may be effected by means of a draw bar member 6.

This carrier member, and the pins, are adapted to be raised or lowered to thrust the pins into and out of the mold cavity. In order to accomplish this, I have provided a rectangular draw bar member 6, Figures 1, 2, 3 and 4, that is disposed in the bifurcated portion 37 of the carrier 36. The longitudinal lower side of this draw bar rests on the base 3 and is supported by a sleeve 39 and, during the operation of this device, is adapted to be reciprocated back and forth thereacross. In Figures 1, 3 and 4, the draw bar is shown as having an angling cam slot 40 therein. When the draw bar is positioned in the bifurcated portion 37 of the carrier 36, a pin 41 is inserted through suitable openings in the lower end of the bifurcated portion and also extends through the slot 40.

It can readily be seen that when the draw bar is reciprocated longitudinally by means of its handle 42, the cooperation of the pin 41 with the slot 40 will cause the carrier 36 and the pins 17 to be moved vertically to elevate and lower the pins within the mold cavity. A circular sleeve 39, that is bifurcated as at 43, is formed integrally with the base and extends upwardly therefrom. The lower end of this carrier 36 is adapted to reciprocate in the sleeve 39, Figure 1, and the lower portion of the draw bar 6 is also partially supported in the bifurcated portion of the sleeve 39.

The pins 17 may be arranged in any position desired on the supporting surface 33 and they are adapted to be projected into the mold cavity until their flattened heads intercept and lie in intimate contact with the horizontal upper face 16 of the mold cavity. At this time, the body of the pins should have fully entered the openings 30 and there should be a close fit therebetween to preclude the escape of any molten material therearound.

In the performance of my method, the draw bar 6 is first moved in the proper direction to project the pins 17 into the mold cavity to allow the flattened heads thereof to lie in close contact with the horizontal portion 16, Figures 1, 3, 4 and 5, of the upper mold section. A charge of glass A, Figure 3, is then introduced into the ring 24 in any manner desired, and the plunger is brought into position directly thereover. The plunger is next moved downwardly to force the charge of glass A, Figure 4, into the mold cavity and around the pins 17. It will be noted, at this time, that a font 44 is also formed on the blank by forcing the molten material into the especially formed opening that leads into the mold cavity. It is apparent that this passageway may take any shape or form desired and I do not wish to limit myself as to the exact form of the font that might be formed on the blank 45, it being sufficient in this instance to say that the font is connected to the body portion of the blank 45 by a somewhat narrow neck 46 and the body portion is of such size that it may be readily grasped by a transfer means.

The plunger 27, Figure 5, is next lifted from the mold and, after the material has become fixed sufficiently to allow the openings to retain their contour, the draw bar 6 is pulled in the proper direction to withdraw the pins 17 from the blank 45 in the mold cavity. Thus, the blank 45 is left with a plurality of vertical bores 47 therein that extend entirely through the body portion and are open at each end.

The split sections of the mold are now opened to allow access to the blank as shown in Figure 6. Here it is shown supported on the mold block 1. At this time, the blank comprises a body portion 48 and a font 44 embodies a narrow neck 46. It will also be noted, that the article is provided with a substantially horizontal portion 49 that is later to be concaved to form the smooth under surface of the base.

Figure 8:
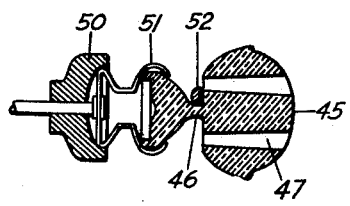
Figure 8 is a detail in section showing how I preferably reduce the neck of the font prior to severance from the main body portion.

With reference to Figure 7, I have shown a means 50 for lifting the article 45 from the mold block 1. This means is provided with the snap members 51 that are adapted to embrace the portion of the font directly above the neck in such a manner as to securely support the font and article in any position to which it may be moved. The carrier 50 is next brought to horizontal position and rotated at a high rate of speed, as shown in Figure 8, and a tool 52 is brought into engagement with the neck 46 to reduce it in diameter until such time as the neck of the font portion may be readily knocked from the main body of the article.

Figure 9:
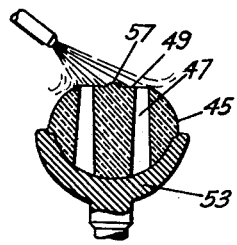
Figure 9 is a detail in section showing the glass blank supported in a former during reheating thereof.
Figure 10:
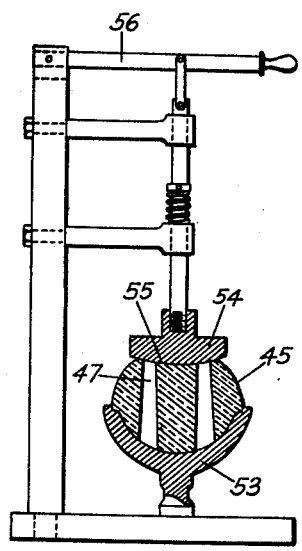
Figure 10 is an elevation, partly in section, showing the means which I preferably utilize for concaving and smoothing the bottom of the article.

The article 45 is next disposed in the former 53 that is substantially circular in horizontal cross-section and arcuate in vertical cross-section to conform with the contour of the crown of the blank 45 that will rest therein in inverted position. The flattened base of the article is next heated, as shown in Figure 9, to the proper degree of plasticity and then a second plunger 54, having a substantially convex lower surface 55 is forced downwardly, by means of the pivoted hand lever 56, Figure 10, onto the inverted article. As hereinbefore mentioned, the lower surface 55 of the plunger 54 is substantially convex and when it is forced downwardly into engagement with the surface 49 of the inverted article, it will tend to concave and smooth this portion. It will be noted that the upstanding projection 57, Figure 9, that remains on the article 45 after the font has been knocked therefrom, is entirely eliminated.

The article may now be removed from the former and placed in a suitable lehr to allow the article to be again subjected to heat to remove the strains therefrom.

Figure 11:
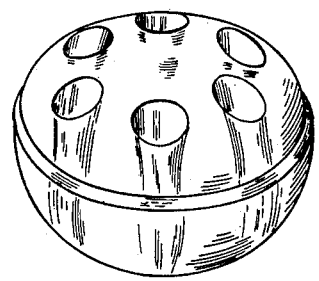
Figure 11 is a perspective view of the finished article, showing the smooth arcuate upper surface thereof.
Figure 12:
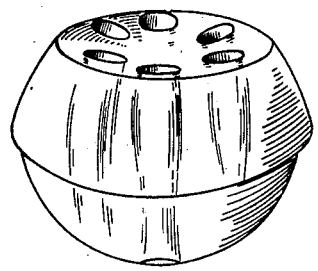
Figure 12 is a perspective view of the article shown in Figure 9, showing the concave base thereof.

The finished article is best shown in Figures 11 and 12. It will be noted in Figure 11 that the crown is substantially convex and the lowermost portion of this upper surface is slightly less in diameter than the uppermost portion of the base section.

The base of the article is best shown in Figure 12. This base is smooth and concave, the openings are not ragged at their lowermost ends and the surface is not cracked or chipped. Concaving the base in this manner presents an annular ridge on which the block seats, thus reducing the tendency of the block to seat improperly, as in blocks where the seat is a flattened surface. Furthermore, this concave structure facilitates access of the water to the block openings and flower stems from beneath.

It will be noted from the foregoing description that I have provided a method for forming a flower block wherein the openings therein are formed entirely therethrough in one operation. By positioning the pins within the mold cavity prior to the insertion therein of a charge of glass, I have made it possible to press the glass therein in such a manner as to cause it to surround and embrace these pins which, when withdrawn, leave a clean smooth bore in the article thus formed.

Having thus described my invention, what I claim is:

1. The method of forming glass flower blocks which comprises forcing glass into a font mold to form a blank while simultaneously forming openings extending entirely therethrough and which are open at each end, removing the blank from the mold by grasping the font thereof, subjecting the blank while it is still in a semi-plastic state to an operation to reduce the diameter of the neck joining the font to the body portion of the blank, removing the font, reheating the base of said blank, and then concaving the base to produce the finished article.

2. The method of making glassware which comprises forcing glass into a font mold to form a blank while simultaneously forming openings extending entirely therethrough and which are open at each end, removing the blank from the mold by grasping the font thereof, subjecting the blank while it is still in a semi-plastic state to an operation to reduce the diameter of the neck joining the font to the body portion of the blank, removing the font, and then concaving and smoothing the base of the blank to produce the finished article.

3. The method of making glassware which comprises forcing glass into a font mold to form a blank while simultaneously forming openings therein, removing the blank from the mold by grasping the font thereof, subjecting the blank while it is still in a semi-plastic state to an operation to reduce the diameter of the neck joining the font to the body portion of the blank, removing the font, concaving and smoothing the base of the blank to produce the finished article, and then placing such article in a lehr to remove the strains therefrom.

4. The method of forming flower blocks which comprises forming the blocks by pressing glass into a font mold having opening forming members in said mold, removing the blank from said mold by grasping the font thereof, subjecting the blank while it is still in a semi-plastic state to an operation to reduce the diameter of the neck joining the font to the body portion of the blank, removing the font, reheating the blank, concaving and smoothing the base of the blank to produce the finished article, and then placing such article in a lehr to remove the strains therefrom.

5. The method of forming glass flower blocks which comprises charging glass into a font mold having a plurality of members therein adapted to form sockets in the blank produced in said mold, removing the blank from the mold by grasping the font thereof, subjecting the blank while it is still in a semi-plastic state, to an operation to reduce the diameter of the neck joining the font to the body portion of the blank, removing the font, reheating the base of said blank, and then concaving the base to produce the finished article.

6. The method of forming glass flower blocks which comprises charging glass into a font mold having a plurality of members therein adapted to form sockets in the blank produced in said mold, removing the blank from the mold by grasping the font thereof, subjecting the blank while it is still in a semi-plastic state, to an operation to reduce the diameter of the neck joining the font to the body portion of the blank, and then removing the font from the blank.

7. The method of forming glass flower blocks which comprises charging glass into a font mold having a plurality of members therein adapted to form sockets in the blank produced in said mold, removing the blank from the mold by grasping the font thereof, removing the font from said blank, reheating the base of said blank, and then concaving the base to produce the finished article.

8. The method of forming glass flower blocks which comprises charging glass into a font mold having a plurality of members therein adapted to form sockets in the blank produced in said mold, removing the blank from said mold by grasping the font thereof, removing the font from said blank, and then concaving the base of said blank.

9. The method of producing glass articles which comprises forming a blank in a mold of such a type that a font will be produced on said blank, said font having a body portion and a narrow neck portion joining said body portion of the font to said blank, removing the blank from the mold by grasping the font thereof, removing the font from said blank, and then subjecting the blank to an operation to produce the finished article.

RAY C. COBEL.